United States Patent
Godkar et al.

(10) Patent No.: US 12,077,048 B2
(45) Date of Patent: Sep. 3, 2024

(54) HYBRID ELECTRIC DRIVE SYSTEM FOR A VEHICLE

(71) Applicant: NEXTGEN TECH INITIATIVES PVT LTD, Thane (IN)

(72) Inventors: Rohit Arvind Godkar, Thane (IN); Mehul Satish Nachane, Thane (IN); Sharad Rajaram Godkar, Mumbai (IN)

(73) Assignee: NEXTGEN TECH INITIATIVES PVT LTD, Thane (IN)

( * ) Notice: Subject to any disclaimer, the term of this patent is extended or adjusted under 35 U.S.C. 154(b) by 0 days.

(21) Appl. No.: 18/048,620

(22) Filed: Oct. 21, 2022

(65) Prior Publication Data
US 2023/0173908 A1 Jun. 8, 2023

(30) Foreign Application Priority Data
Oct. 23, 2021 (IN) .............................. 202121048405

(51) Int. Cl.
| | | |
|---|---|---|
| *B60K 6/36* | (2007.10) | |
| *B60K 6/365* | (2007.10) | |
| *B60K 6/52* | (2007.10) | |

(52) U.S. Cl.
CPC ................ *B60K 6/365* (2013.01); *B60K 6/52* (2013.01)

(58) Field of Classification Search
CPC .......... F16H 3/44–78; F16H 3/20; F16H 3/34; B60K 6/365; B60K 6/52
See application file for complete search history.

(56) References Cited

U.S. PATENT DOCUMENTS

| | | | | |
|---|---|---|---|---|
| 2,810,293 A | * | 10/1957 | George | F16H 3/34 |
| | | | | 74/15.88 |
| 9,758,146 B2 | * | 9/2017 | Diehl | B60W 10/02 |
| 2020/0114757 A1 | * | 4/2020 | Gasparovic | B60K 5/02 |

FOREIGN PATENT DOCUMENTS

| | | | |
|---|---|---|---|
| NL | 2027910 B1 * | 10/2022 | |
| TW | 201736160 A * | 10/2017 | B60K 6/365 |

OTHER PUBLICATIONS

Applicant Has No Information to Disclose: No patent novelty search was performed in this case and neither the Applicant nor the undersigned are aware of any prior art devices or documents which they believe to be material to the invention as claimed. This document is being supplied for informational purposes to the Examiner and is evidence of our desire to comply with the duty of disclosure.

* cited by examiner

*Primary Examiner* — Derek D Knight
(74) *Attorney, Agent, or Firm* — Emerson Thomson Bennett; Daniel A. Thomson

(57) ABSTRACT

Present invention relates to a vehicle (100) comprising a hybrid electric drive system (106) comprising an electric motor (108) and an epicyclic gear system (110), a common propeller shaft (236) and an internal combustion (IC) engine assembly (118) with a gearbox (116). The hybrid electric drive system (106) is configured between IC engine assembly (118), gearbox (116) and a rear axle differential (238). The hybrid electric drive system (106) performs dual role of allowing drive from each powertrain to be transmitted individually to wheels of the vehicle (102, 104) and adding the drive from each powertrain together and seamlessly transmitting to the wheels of the vehicle (102, 104). Power from both the IC engine (118) and the hybrid electric drive system (106) is transmitted by the common propeller shaft (Continued)

(236) to the rear axle differential (238) through a differential gear.

18 Claims, 16 Drawing Sheets

HYBRID ELECTRIC DRIVE SYSTEM FOR A VEHICLE

CROSS-REFERENCE TO RELATED APPLICATION

This application claims priority to and the benefit of Indian Patent Application No. 202121048405, filed on Oct. 23, 2021, the disclosure of which is incorporated herein by reference in its entirety.

FIELD OF THE INVENTION

Present invention relates to an electric vehicle. More particularly, the present invention relates to a rear wheel drive plug-in Hybrid Electric Drive System (HDS) for a vehicle.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

One of the greatest challenges being faced by human race today is undoubtedly the climate change and its potentially catastrophic consequences for humanity. The ever rising greenhouse gas emissions coupled with massive urbanisation trends create a further challenge where large scale migration to urban areas is creating several high density population clusters that require tremendous resources for survival such as round the clock availability of utilities, products and services to support such urban lifestyle. As a consequence, one of the highest contributors to global greenhouse gas emissions is transportation sector, responsible for nearly quarter of greenhouse gas emissions every year. The urban vehicular emissions not only affect the global temperature rise and the climate, but also the health of the urban populations as they inhale those harmful vehicular emissions that create health hazards including early deaths and COPD (chronic obstructive pulmonary disorders).

There has been a strong scientific evidence and record of such health hazards and ailments which need to be addressed with the sense of urgency, by providing more workable solutions for sustainable mobility which reduces the quantum of harmful emissions. At the same time, the consumers of automobile sector are used to certain conveniences with respect to ease of fueling, long range on a full fuel tank, as well as certain driving features which can't be taken away from them in an instant by switching to non-IC engine vehicles such as fully electric vehicles, which are short on features and conveniences keeping in mind the mass affordability factor. The fully electric vehicles have several shortcomings such as long recharge times, inconvenience of not having adequate charging facilities, range anxiety for drivers and passengers as a result of relatively short range on a single charge, load carrying limitations in steep uphill terrains, etc.

Therefore, there is a need to first migrate to an intermittent stage of hybrid electric mobility solution whereby all shortcomings of a full electric vehicle as mentioned above can be effectively addressed; and during urban and large parts of inter city transportation routes, the vehicles can operate on fully electric mode easily. This will create at least 80% more green miles by consumers switching to intelligent plug in hybrid electric vehicles and operating in zero emissions mode for most of the miles driven. The additional benefits of re-cycling and up-cycling of existing IC engine vehicle parts will reduce the greenhouse emissions further by extending the life of in-use products in the integrated supply chain. On a national level, the resulting savings of imported fuel and the consequential benefits to Indian economy is certainly a huge advantage and makes a strong case for economic stimulus to be given by the Government for faster and broader adoption of such sustainable mobility solutions, such as the one which is described in this application.

Hence the need to develop a hybrid electric drive system of a vehicle that can result in a less polluting, eco-friendly, and low operational cost plug-in hybrid electric four wheeler.

OBJECTS OF THE PRESENT DISCLOSURE

Some of the objects of the present disclosure, which at least one embodiment herein satisfies are as listed herein below.

Accordingly, it is an object of the present invention to provide a hybrid electric drive to the rear wheel drive four wheelers by using a hybrid electric drive system (interchangeably known as Hybrid Drive System (HDS)) comprising an electric motor, an epicyclic gear system, and a mode controller that is uniquely used to add, transfer and regulate both the IC engine and electric motor torque to the drive shaft. The hybrid electric drive system is mounted between the IC engine assembly gearbox and the final rear axle drive. This would enable a faster and simpler conversion method to convert IC engine driven four-wheeler vehicle architectures to a plug-in hybrid electric four-wheeler.

It is another object of the present invention to provide a user defined mode selection by incorporating a uniquely designed mode controller into the hybrid electric drive system to operate in conjunction with the epicyclic gear system. This would enable the user to control the mode of operation of the vehicle in specifically mandated zero vehicular pollution zones in urban areas.

It is another object of the present invention to build for a rear wheel drive IC engine driven four wheel vehicle architecture, a plug-in hybrid electric drive system which is a simple, manufacturer and labor-friendly production alternative to the existing well-known IC engine vehicle architecture. Thereby, allowing the re-cycling or up-cycling of the existing IC engine drive train components thus extending the usable lifetime of the vehicle.

It is another object of the present invention to simplify the installation of an electric drive assembly comprising of parts such as the hybrid electric drive system which contain the uniquely designed epicyclic gear system, the user-friendly mode controller, and electric motor, on an existing IC engine vehicle architecture with minimal modification to the existing design and the assembly process of the vehicle. Thereby, allowing the manufacturers to use the existing assembly lines with minimal additions and hence keep both the design and manufacturing costs low.

It is another object of the present invention to simplify the installation of an electric drive assembly comprising of parts such as the hybrid electric drive system which contain the uniquely designed epicyclic gear system, the user-friendly mode controller and electric motor, on an existing IC engine vehicle with minimal modification for mounting the system thereby allowing easy and modular retrofitment solutions for already existing vehicles on the road.

It is another object of the present invention to combine the IC engine and electric drive and synchronize the torque addition in a way to utilize the specific torque-speed characteristics of the IC engine and the electric motor to enable a highly efficient and low emissions and low fuel consumption operation of the combined powertrain.

SUMMARY

Present invention relates to an electric vehicle. More particularly, the present invention relates to a rear wheel drive plug-in Hybrid Electric Drive System (HDS) for a vehicle.

According to an aspect of the present disclosure, a vehicle comprises a hybrid electric drive system which can comprise an electric motor and an epicyclic gear system. The vehicle comprises a common propeller shaft and an internal combustion (IC) engine assembly with a gearbox. The hybrid electric drive system can be configured between the IC engine gearbox and a rear axle differential. Further, the hybrid electric drive system can perform dual role of allowing drive from each powertrain to be transmitted individually to wheels of the vehicle and adding the drive from each powertrain together and seamlessly transmitting to the wheels of the vehicle. The power from both IC engine and the electric drive can be transmitted by the common propeller shaft to the rear axle through a differential gear.

According to an aspect of the present disclosure, the vehicle can be a rear wheel drive plug-in hybrid electric four wheeler vehicle.

According to an aspect of the present disclosure, the hybrid electric drive system can enable driving independently in either an electric mode, an IC engine mode, or a combined mode.

According to an aspect of the present disclosure, the epicyclic gear system can allow electric drive from the electric motor to be transmitted to rear wheels by using the common propeller shaft that transmits IC engine power to the rear wheels.

According to an aspect of the present disclosure, the epicyclic gear system can allow output to be taken from sun gear and input to be given to at least one planet carrier or ring gear. The power from both the IC engine and the electric motor is transmitted to the sun gear, which transmits the power to the common propeller shaft.

According to an aspect of the present disclosure, the epicyclic gear system and the electric motor can be located as a single module on the chassis frame of the vehicle between the IC engine gearbox and the rear axle final drive using mountings.

According to an aspect of the present disclosure, the hybrid electric drive system can comprise a mechanical cable operated assembly that controls the operation of a plurality of vehicle drive modes by locking elements of the epicyclic gear system.

According to an aspect of the present disclosure, the hybrid electric drive system can comprise a first pinion gear, a second pinion gear, and a third pinion gear. The first pinion gear can lock and unlock the planet carrier, the second pinion gear can transmit motor power to ring gear. Further, the third pinion gear can lock and unlock the ring gear, where the first, second, and third pinion gears are mounted on levers that move in different positions to enable three different driving modes.

According to an aspect of the present disclosure, an electric or IC engine mode can be implemented when the levers are moved in a position so that the planet carrier can be unlocked. Further, the electric motor power can be transmitted to the planet carrier through a series of pinion gears, and the ring gear can be locked by pinion such that depending on the switch being on, the electric mode or IC engine mode respectively can be enabled.

According to an aspect of the present disclosure, a combined mode can be implemented when the lever is moved in a position so that the planet carrier can be unlocked. Further, the motor power can be transmitted to the planet carrier, and the ring gear can be unlocked such that unlocking of the ring gear allows the sun gear to adjust to the power being transmitted from both IC Engine and electric motor.

According to an aspect of the present disclosure, a combined accelerator of the vehicle designed with a configurable phase lag allows the electric motor to speed up earlier than the IC engine to take advantage of the high initial starting torque of the electric power-train while being driven in the combined mode.

According to an aspect of the present disclosure, when the vehicle is in reverse electric mode, the levers are moved in a position so that the planet carrier can be locked by pinion, and electric motor power can be transmitted to the ring gear via compound pinion gear causing the sun gear to spin in opposite direction to that of the ring gear thereby reversing the motion.

According to an aspect of the present disclosure, locking of the planet carrier and providing electric motor power to the ring gear causes the sun gear to provide the output torque to the drive shaft to spin in a direction opposite to the motor rotation.

According to an aspect of the present disclosure, during regeneration, mechanical power can be transferred from sun gear to planet carrier with the ring gear locked or unlocked results in different levels of regeneration to allow the battery pack to be recharged depending on the state of charge.

According to an aspect of the present disclosure, the battery pack of the vehicle is placed on chassis of the vehicle under its body.

According to an aspect of the present disclosure, a microprocessor operated system can control the operation of one or more modes by locking different elements of the epicyclic gear system. A set of solenoid valves operates hydraulic actuators as per desired signal given by the user via the microprocessor, the hydraulic actuators operate levers, the epicyclic gear system can comprise a first pinion gear, a second pinion gear, and a third pinion gear. The first pinion gear can lock and unlock the planet carrier, the third pinion gear can lock and unlock ring gear, and the second pinion gear can transmit motor power to the ring gear. These pinions are mounted on the levers that move in different positions to enable the three different driving modes.

According to an aspect of the present disclosure, the vehicle can comprise an optional fueling system of hydrogen fuel cells stack providing the electrical energy to operate the electric motor. The hydrogen fuel cells stack, the liquid hydrogen tank and the battery pack of the vehicle can be mounted on chassis of the vehicle under its body.

According to an aspect of the present disclosure, the electrical energy to operate the electric motor can be provided by an arrangement of ultra-capacitors.

According to an aspect of the present disclosure, a hybrid electric drive system of a vehicle, the hybrid electric drive system can perform the dual role of allowing drive from each powertrain to be transmitted individually to wheels of the vehicle and adding the drive from each powertrain together and seamlessly transmitting to the wheels of the vehicle. The hybrid electric drive system can comprise an electric motor and an epicyclic gear system. The vehicle comprises a common propeller shaft and an internal combustion (IC) engine assembly having an IC engine gearbox such that the hybrid electric drive system is configured between the IC engine gearbox and the rear axle differential. The power from both the IC engine and the electric drive is transmitted by the common propeller shaft to the rear axle through a differential gear.

Various objects, features, aspects and advantages of the present disclosure will become more apparent from the following detailed description of preferred embodiments, along with the accompanying drawing figures in which like numerals represent like features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

Figure 1A:
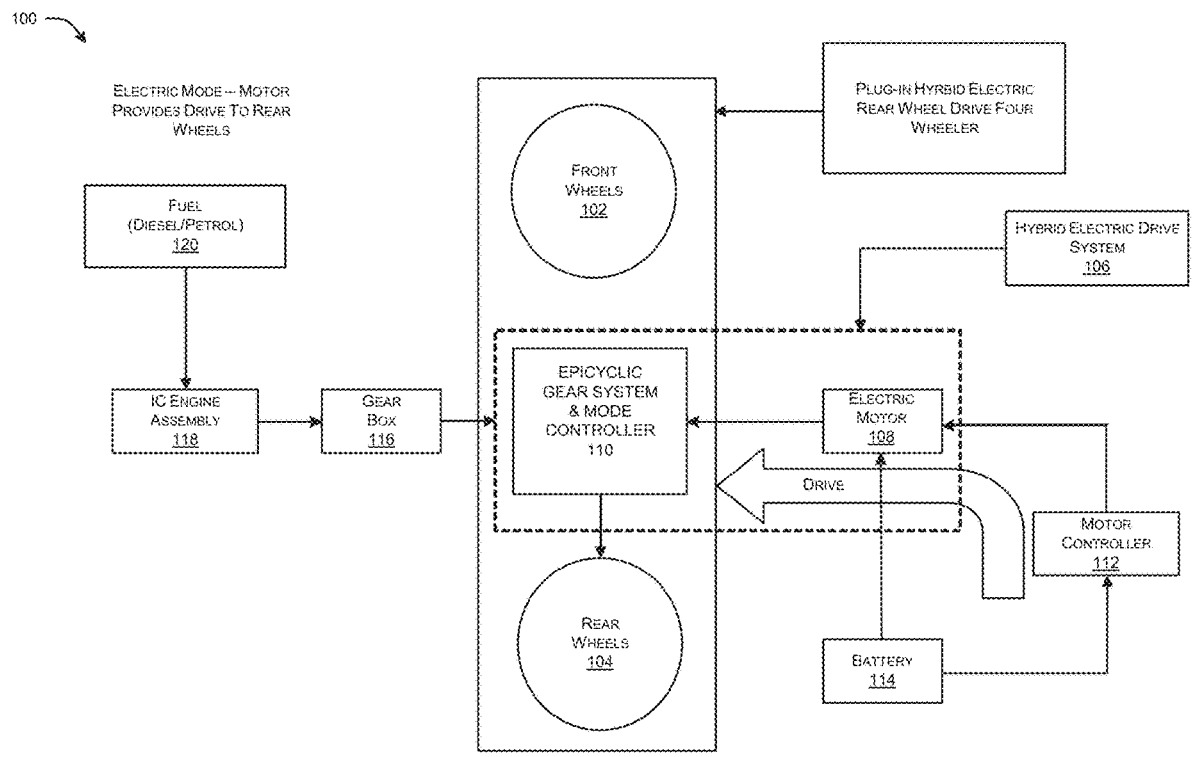
FIG. 1A illustrates an implementation of an electric mode in a vehicle, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

Present invention relates to an electric vehicle. More particularly, the present invention relates to a rear wheel drive plug-in Hybrid Electric Drive System (HDS) for a vehicle.

According to an aspect of the present disclosure, a vehicle comprises a hybrid electric drive system, which includes an electric motor and an epicyclic gear system. The vehicle may include a common propeller shaft and an internal combustion (IC) engine assembly with a gearbox. The hybrid electric drive system may be configured between the IC engine gearbox and a rear axle differential. Further, the hybrid electric drive system can perform dual role of allowing drive from each powertrain to be transmitted individually to wheels of the vehicle and adding the drive from each powertrain together and seamlessly transmitting to the wheels of the vehicle. The power from both IC engine and the electric drive can be transmitted by the common propeller shaft to the rear axle through a differential gear.

According to an aspect of the present disclosure, the vehicle can be a rear wheel drive plug-in hybrid electric four wheeler vehicle.

According to an aspect of the present disclosure, the hybrid electric drive system can enable driving independently in either an electric mode, an IC engine mode, or a combined mode.

According to an aspect of the present disclosure, the epicyclic gear system can allow electric drive from the electric motor to be transmitted to rear wheels by using the common propeller shaft that transmits IC engine power to the rear wheels.

According to an aspect of the present disclosure, the epicyclic gear system can allow output to be taken from sun gear and input to be given to at least one of planet carrier or ring gear. The power from both the IC engine and the electric motor is transmitted to the sun gear, which transmits the power to the common propeller shaft.

According to an aspect of the present disclosure, the epicyclic gear system and the electric motor can be located as a single module on chassis frame of the vehicle between the IC engine gearbox and the rear axle final drive using mountings.

According to an aspect of the present disclosure, the hybrid electric drive system can comprise a mechanical cable operated assembly that controls operation of a plurality of vehicle drive modes by locking elements of the epicyclic gear system.

According to an aspect of the present disclosure, the hybrid electric drive system can comprise a first pinion gear, a second pinion gear, and a third pinion gear. The first pinion gear can lock and unlock planet carrier, the second pinion gear can transmit motor power to ring gear. Further, the third pinion gear can lock and unlock the ring gear, where the first, second, and third pinion gears are mounted on levers that move in different positions to enable three different driving modes.

According to an aspect of the present disclosure, an electric or IC engine mode can be implemented when the levers are moved in a position so that the planet carrier can be unlocked. Further, the electric motor power can be transmitted to the planet carrier through a series of pinion gears, and the ring gear can be locked by pinion such that depending on the switch being on, the electric mode or IC engine mode respectively can be enabled.

According to an aspect of the present disclosure, a combined mode can be implemented when the lever is moved in a position so that the planet carrier can be unlocked. Further, the motor power can be transmitted to the planet carrier, and the ring gear can be unlocked such that unlocking of the ring gear allows the sun gear to adjust to the power being transmitted from both IC Engine and electric motor.

According to an aspect of the present disclosure, a combined accelerator of the vehicle designed with a configurable phase lag allows the electric motor to speed up earlier than the IC engine to take advantage of the high initial starting torque of the electric power-train while being driven in the combined mode.

According to an aspect of the present disclosure, when the vehicle is in reverse electric mode, the levers are moved in a position so that the planet carrier can be locked by pinion, and electric motor power can be transmitted to the ring gear via compound pinion gear causing the sun gear to spin in opposite direction to that of the ring gear thereby reversing the motion.

According to an aspect of the present disclosure, locking of the planet carrier and providing electric motor power to the ring gear causes the sun gear to provide the output torque to the drive shaft to spin in a direction opposite to the motor rotation.

According to an aspect of the present disclosure, during regeneration, mechanical power can be transferred from sun gear to planet carrier with the ring gear locked or unlocked results in different levels of regeneration to allow battery pack to be recharged depending on the state of charge.

According to an aspect of the present disclosure, the battery pack of the vehicle is placed on chassis of the vehicle under its body.

According to an aspect of the present disclosure, a microprocessor operated system can control operation of one or more modes by locking different elements of the epicyclic gear system. A set of solenoid valves operates hydraulic actuators as per desired signal given by user via the microprocessor, the hydraulic actuators operate levers, the epicyclic gear system can comprise a first pinion gear, a second pinion gear, and a third pinion gear. The first pinion gear can lock and unlock planet carrier, the third pinion gear can lock and unlock ring gear, and the second pinion gear can transmit motor power to the ring gear. These pinions are mounted on the levers that move in different positions to enable the three different driving modes.

According to an aspect of the present disclosure, the vehicle can comprise an optional fueling system of hydrogen fuel cells stack providing the electrical energy to operate the electric motor. The hydrogen fuel cells stack, the liquid hydrogen tank and battery pack of the vehicle can be mounted on chassis of the vehicle under its body.

According to an aspect of the present disclosure, the electrical energy to operate the electric motor can be provided by an arrangement of ultra-capacitors.

According to an aspect of the present disclosure, a hybrid electric drive system of a vehicle, the hybrid electric drive system can perform the dual role of allowing drive from each powertrain to be transmitted individually to wheels of the vehicle and adding the drive from each powertrain together and seamlessly transmitting to the wheels of the vehicle. The hybrid electric drive system can comprise an electric motor and an epicyclic gear system. The vehicle comprises a common propeller shaft and an internal combustion (IC) engine assembly having an IC engine gearbox such that the hybrid electric drive system is configured between the IC engine gearbox and the rear axle differential. The power from both the IC engine and the electric drive is transmitted by the common propeller shaft to the rear axle through a differential gear.

FIG. 1A illustrates an implementation of an electric mode in a vehicle, in accordance with an embodiment of the present disclosure.

According to an embodiment, a hybrid electric drive system 106 is implemented in a vehicle 100 (also interchangeably referred to as rear wheel drive hybrid electric four wheeler). The hybrid electric drive system 106 (also interchangeably referred as hybrid electric drive train) comprising an electric motor 108 and an epicyclic gear system and mode controller 110. The vehicle 100 includes a common propeller shaft 236 (also interchangeably known as "propeller shaft differential side"), an internal combustion (IC) engine assembly 118, a gearbox 116 (also interchangeably referred to as "manual gear box"), front wheels of the vehicle 102, rear wheels of the vehicle 104, a battery 114, a rear axle differential 404, motor controller 112, and fuel unit 120.

According to an embodiment, the vehicle 100 includes the electric motor 108, gearbox 16, the epicyclic gear system and mode controller 110, and the battery 114. The mechanism implemented in the present invention is used for converting an existing IC engine rear wheel drive four wheeler in to a rear wheel drive plug-in hybrid electric four wheeler as a retrofit solution. Further, the present invention is used for building a rear wheel drive plug-in hybrid electric four wheeler at manufacturing stage using the prevalent IC engine vehicle architecture.

In an embodiment, the hybrid electric drive system 106 includes an epicyclic (also interchangeably known as "planetary") gear system 110, which facilitates in utilizing the torque generated from both the electric motor 108 and the IC engine assembly 118 either independently or in a combined way. The hybrid electric drive system 106 provides seamless synchronization of the IC engine drive and the electric drive by taking it from the IC engine assembly 118, the gear box 116, and the electric motor 108. Further, the added or individual drives are transmitted to the propeller shaft differential side 236 of the vehicle 100 and from there on to the final rear axle drive. The technical specification of the electric drive that includes the electric motor 108 capacity, the related gear ratios of the epicyclic gear system 110 and the battery capacity can be customized as per the user's preferences.

In an embodiment, FIG. 1A illustrates an electric mode in a vehicle. The rear wheel drive hybrid electric four wheeler 100 can be operated in electric mode. The electric motor provides a drive to the rear axle via the epicyclic gear system 110 and the propeller shaft 236.

Figure 1B:
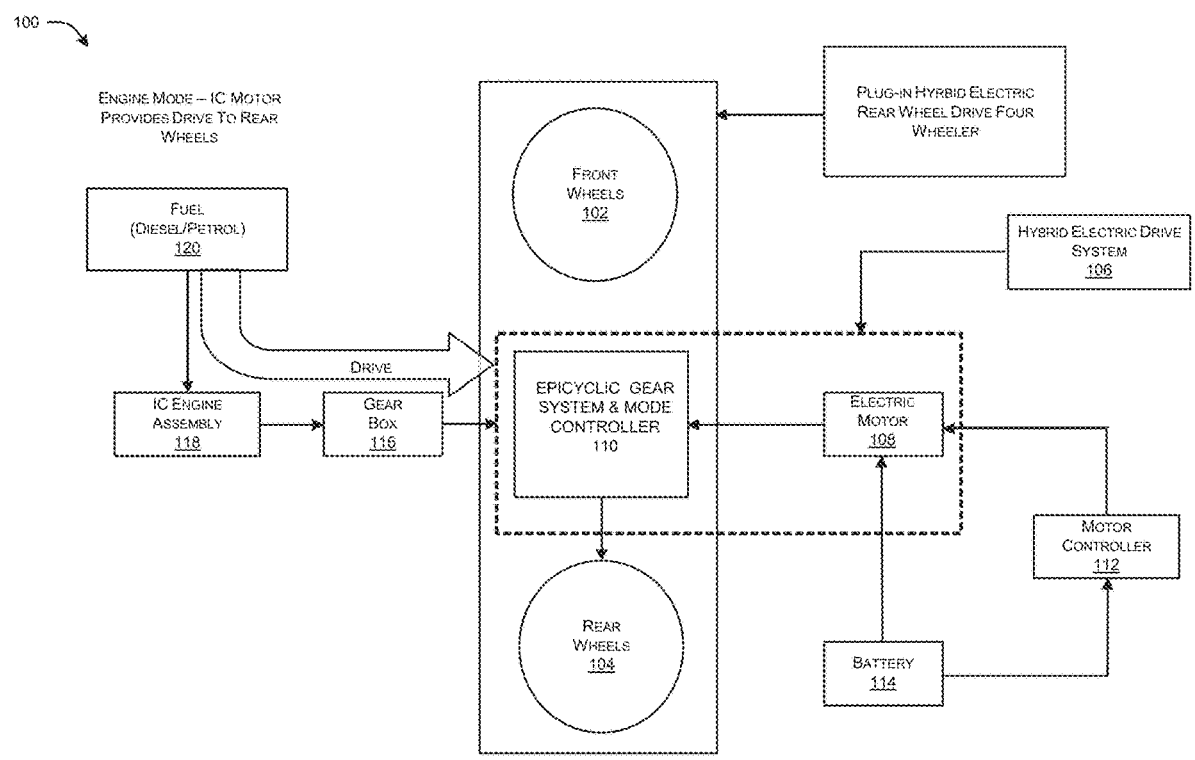
FIG. 1B illustrates an implementation of an engine mode in the vehicle, in accordance with an embodiment of the present disclosure.

In an embodiment, FIG. 1B illustrates an engine mode in a vehicle 100. The rear wheel drive hybrid electric four wheeler can be operated in an engine mode. The IC engine assembly 118 provides the drive to the rear axle via the manual gearbox 116, the epicyclic gear system 110 and the propeller shaft 236.

Figure 1C:
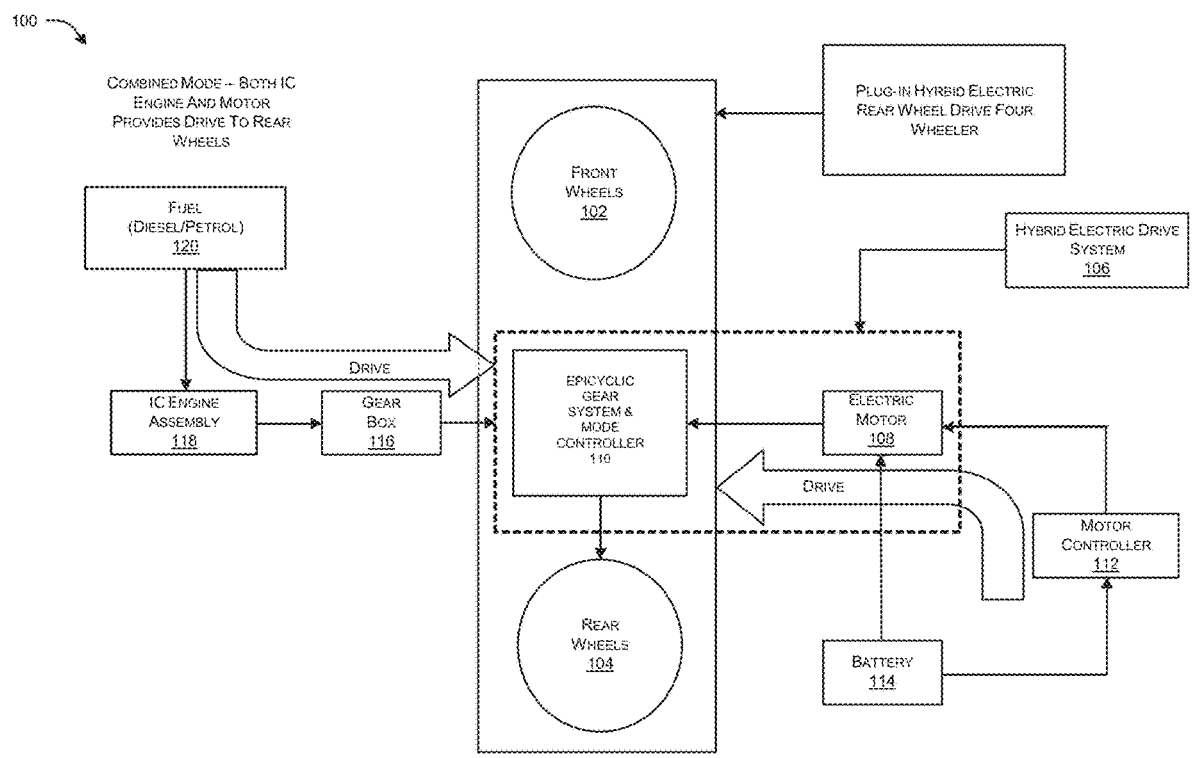
FIG. 1C illustrates an implementation of a combined mode in the vehicle, in accordance with an embodiment of the present disclosure.

In an embodiment, FIG. 1C illustrates a combined mode in a vehicle 100. The rear wheel drive hybrid electric four wheeler can be operated in combined mode. Both the electric motor 108 and the IC engine assembly 118 provide the drive to the rear axle via the epicyclic gear system 110 and the propeller shaft 236.

Figure 1D:
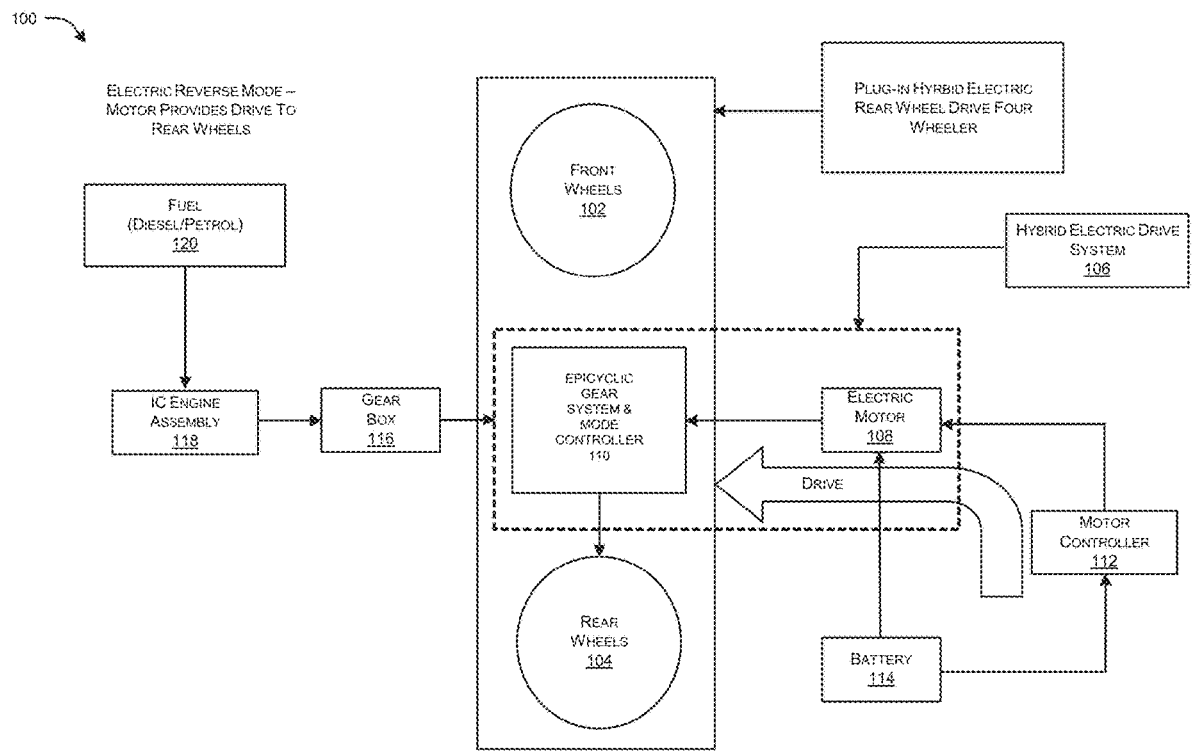
FIG. 1D illustrates an implementation of an electric reverse mode in the vehicle, in accordance with an embodiment of the present disclosure.

In an embodiment, FIG. 1D illustrates an electric reverse mode in a vehicle 100. The rear wheel drive hybrid electric four wheeler can be operated in an electric reverse mode. The electric motor 108 provides a drive to the rear axle via the epicyclic gear system 110 where the direction gets reversed by the epicyclic gear system 110 and then transmitted to the propeller shaft 236.

In another embodiment, the reversing of the vehicle 100 of the present invention is possible in the electric mode, thereby making the vehicle 100 versatile to use in various duty cycles. The reverse mode is possible without reversing the electric motor 108 by designing a unique usage of the epicyclic gear system in conjunction with the mode controller 110 of the hybrid electric drive system 106, thereby allowing the torque supplied by the electric motor 108 to be transferred to the final drive shaft but in opposite rotation.

Figure 1E:
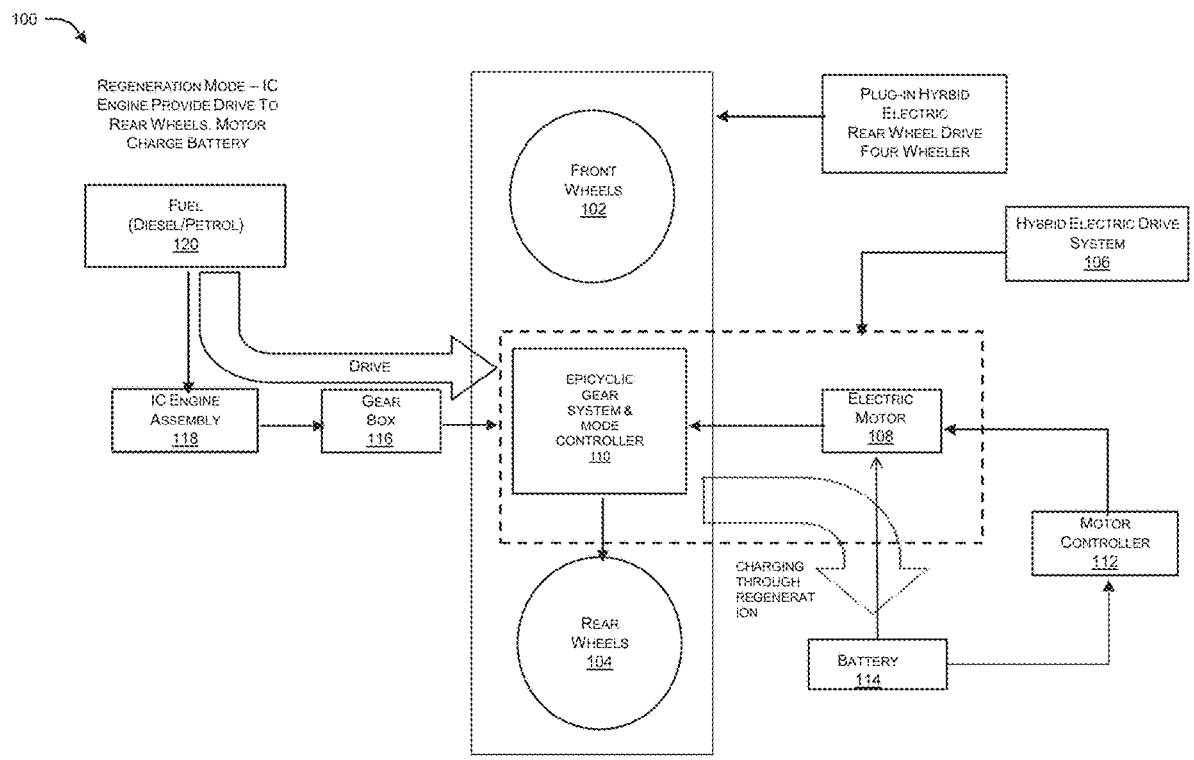
FIG. 1E illustrates an implementation of a regeneration mode in the vehicle, in accordance with an embodiment of the present disclosure.

In an embodiment, FIG. 1E illustrates a regeneration mode in a vehicle 100. The rear wheel drive hybrid electric four wheeler can be operated in the regeneration mode. The electric motor 108 acts as a generator and charges the battery 114 while the vehicle 100 is being driven by the IC engine assembly 118. Even while braking the electric motor 108 will act as a generator and recharge the battery 114.

In another embodiment, the present invention includes an energy recuperation system that makes innovative use of mechanical power transfer from different elements of the hybrid electric drive system 106 to result in varying levels of regeneration current being fed back into the battery 114 when the vehicle 100 is decelerating or there is a need to apply brakes.

Figure 2A:
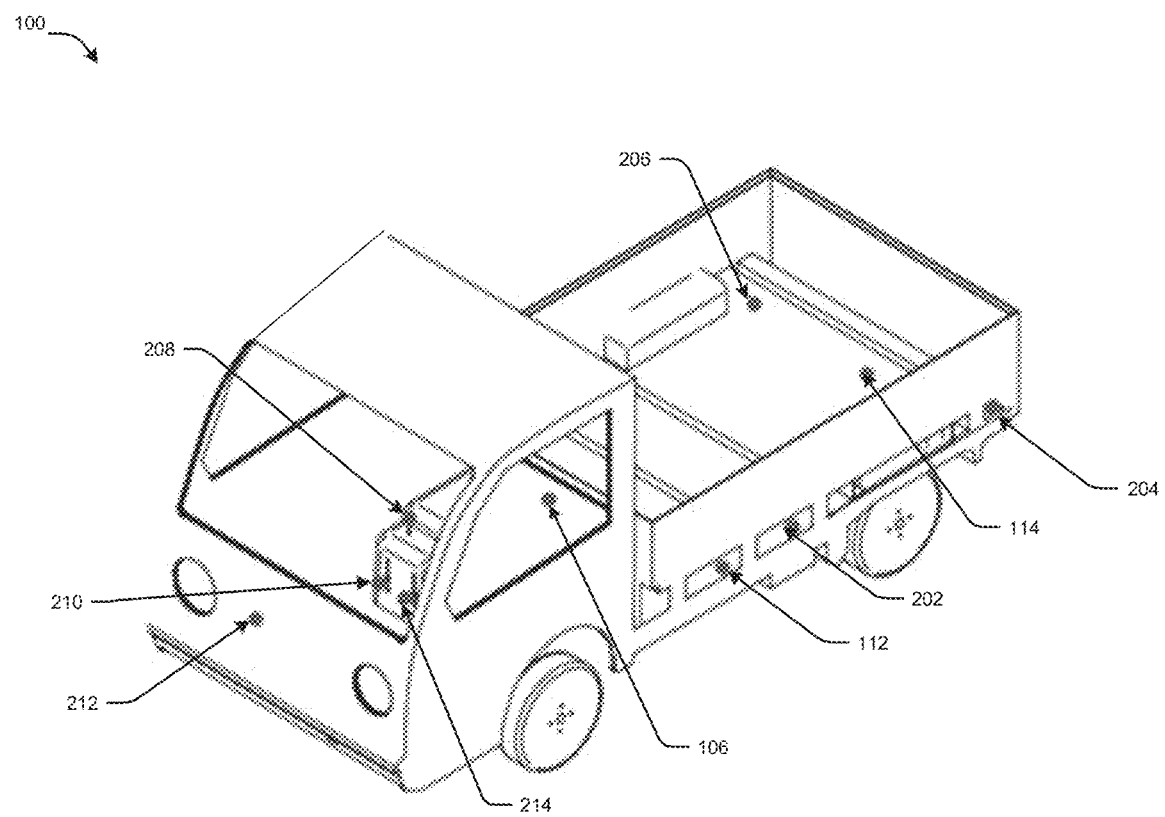
FIG. 2A illustrates a general arrangement of the vehicle from passenger side, in accordance with an embodiment of the present disclosure.

FIG. 2A illustrates a general arrangement of the vehicle from a passenger side, in accordance with an embodiment of the present disclosure.

FIG. 2A illustrates a general arrangement of the hybrid electric drive system 106 of the rear wheel drive four wheeler from passenger side. The vehicle 100 includes a motor controller 112, an invertor and DC convertor 202, a battery 114, charging point 204, a Cable Harness (HV) 206, a gear lever 208, a hand brake 210, Cable Harness (LV) 212, a mode selector lever 214.

Figure 2B:
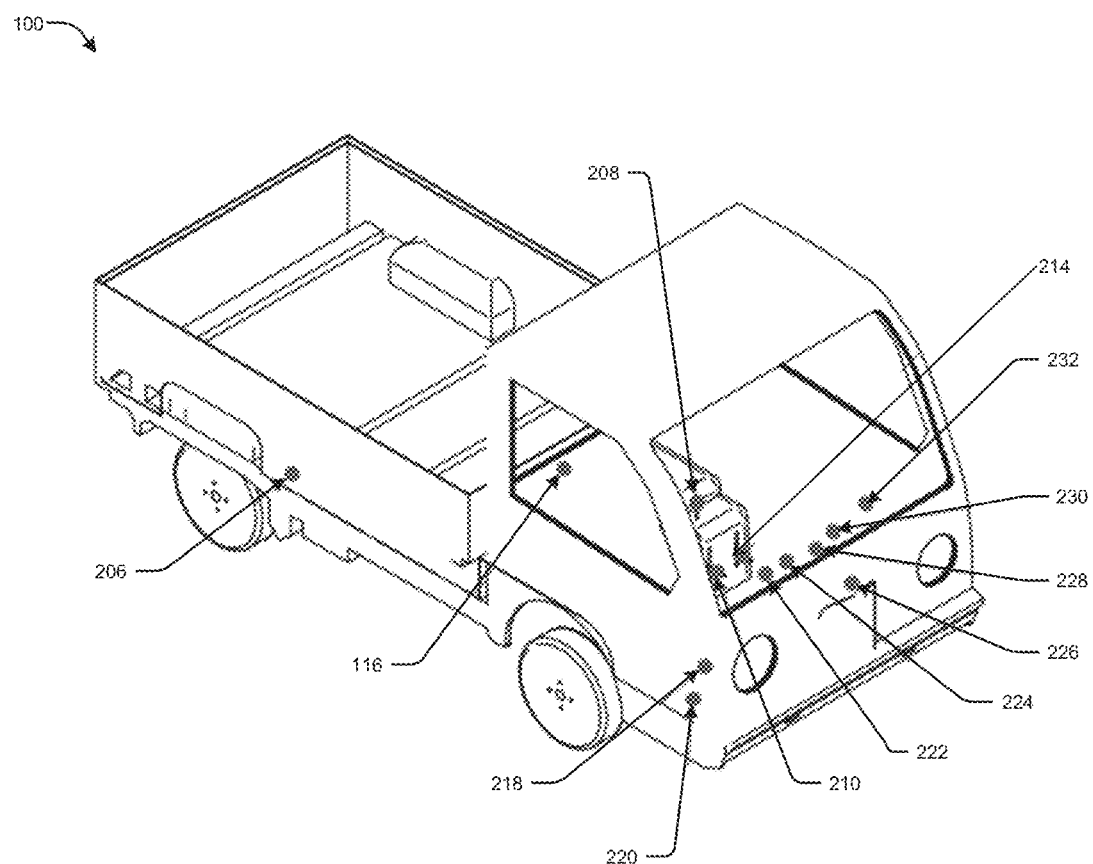
FIG. 2B illustrates a general arrangement of the vehicle from driver side, in accordance with an embodiment of the present disclosure.

FIG. 2B illustrates a general arrangement of the hybrid electric drive system 106 of the rear wheel drive four wheeler from driver side. The vehicle 100 includes an ICE gear box 116, a break safety switch 218, a combined accelerator 220, a hand brake 210, a mode indicator 222, a neutral safety switch 224, a Cable Harness (LV) 226, a EV Key Switch 228, a ICE Key Switch 230, a audio visual indication 232, a mode selector lever 214, a Cable Harness (HV) 206, a gear lever 208.

Figure 2C:
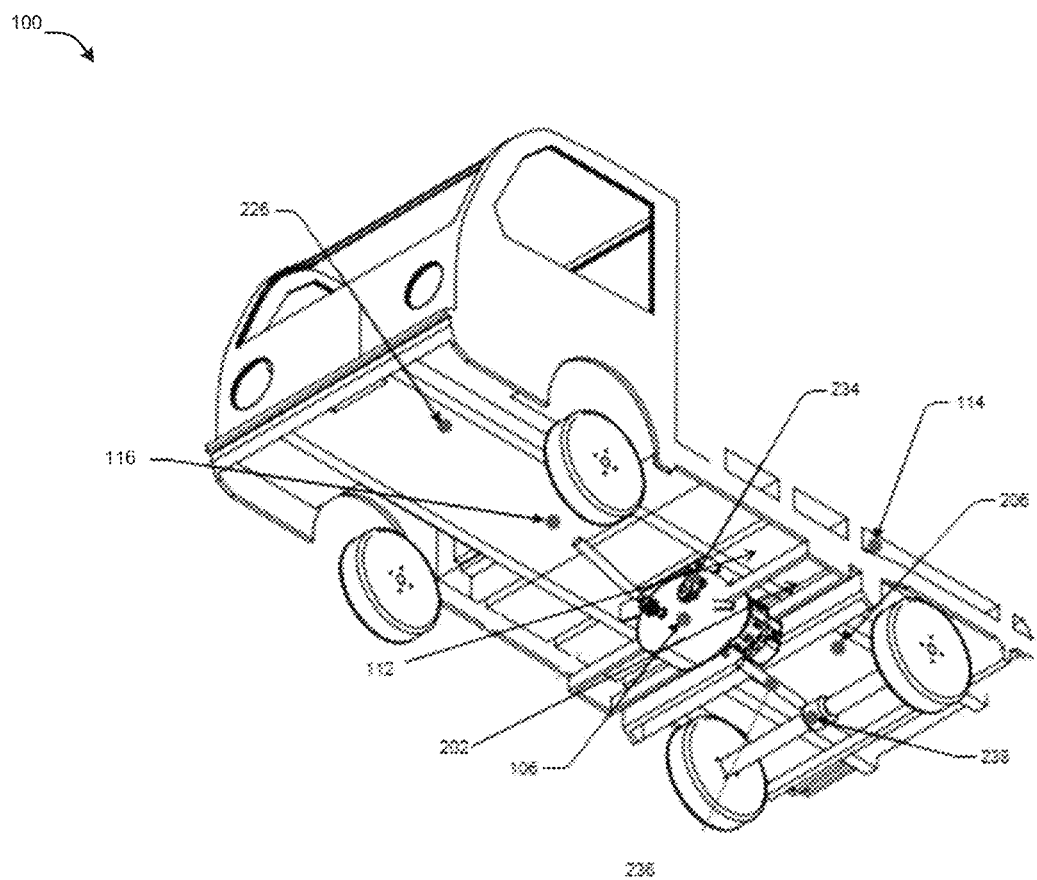
FIG. 2C illustrates a general arrangement of the vehicle from under side, in accordance with an embodiment of the present disclosure.

FIG. 2C illustrates a general arrangement of the hybrid electric drive system 106 of the rear wheel drive four wheeler from under side. The vehicle 100 includes a motor controller 112, an invertor and DC convertor 202, propeller shaft differential side 236, rear axle differential 238, ICE gear box 116, Cable Harness (LV) 226, Mode shifter 234, Battery 114, Cable Harness (HV) 206.

In an embodiment, FIG. 2A indicates location of the motor controller 112. A 1 k ohm pre charging resistor is added across the mains contactor. Similarly, 1K ohm resistor is also added across the key switch for electric mode. Magnetically coupled accelerator 220 interacts with the mode selector lever 214 to provide desired speed control. The motor controller 112 provides proportionate power as per the torque speed demand as directed by the combined accelerator 220. Thermistor control is provided internally through this motor controller 112 for the protection of the electric motor 108 winding from over-heating during rotor lock situation. The break safety switch 218 (also interchangeably referred as safety interlock switch) prevents accidental running of motor while brakes are engaged. The brake pedal is used to actuate the break safety switch 218.

In another embodiment, when the vehicle 100 is enabled to run in electric mode, the gearbox 116 connected to the IC engine assembly 118 must remain in "neutral mode". This action has to be a foolproof system and is obtained by keeping the gear changing lever in a "neutral" position. A neutral safety switch 224 prevents activation of electric mode if the gear lever is not in the neutral position. Thus protection interlocks are achieved. Further, the motor controller 112 provides a regeneration mode to conserve the free-wheeling rotational energy of the driven wheels and also to regenerate during braking done, thereby charging the batteries. Thus this action is capable to further add extra miles as a result of regeneration. Further, the two independent electric key switches 228 and 230 are provided to isolate electric and engine mode. Speed and other display parameters are shown on custom build instrument cluster known as audio visual indication 232. The custom build cable harness 206 is provided for the power and control circuits and regeneration circuit of the motor controller 112, the combined accelerator 220, brake safety switch interlock 218, neutral gear safety switch 224, charging circuit and vehicle operations.

In an embodiment, the hybrid electric drive system 106 is based on the fact, that the existing internal combustion engine drive train IC engine gearbox 116 is kept unaltered till IC engine assembly 118. Further, the present invention includes the hybrid electric drive system 106 which includes the electric motor 108 and the epicyclic gear system in conjunction with mode controller 110 is added between the IC engine assembly 118, gearbox 116, and the rear axle differential final drive 238. Both the IC engine assembly 118 and electric drive power is transmitted by the common drive shaft 236 to the rear axle differential 238 via a differential gear.

Figure 3:
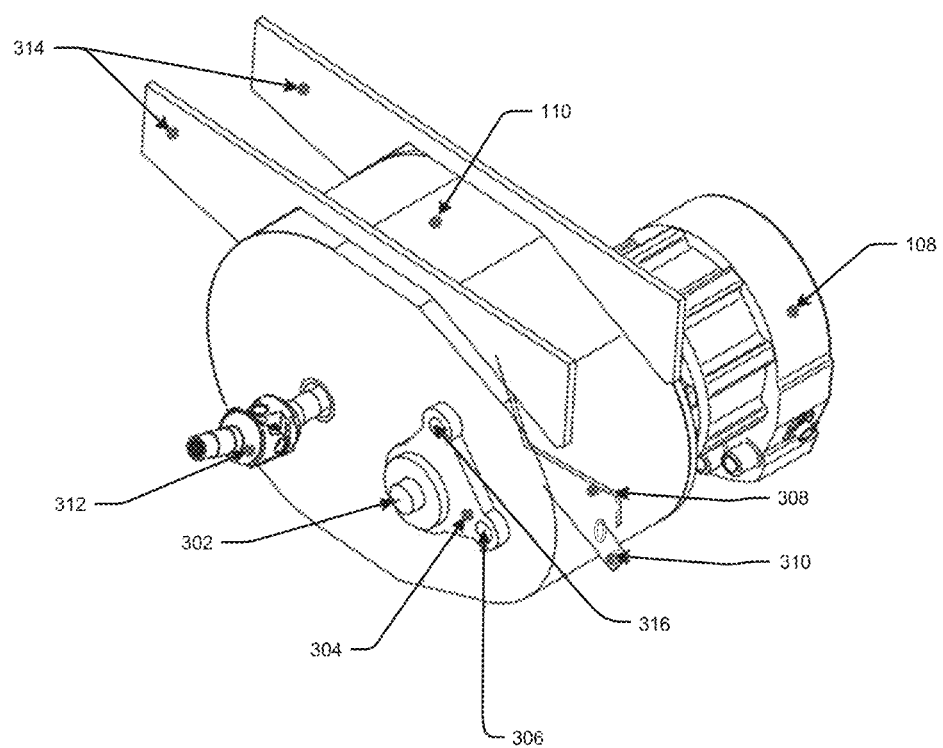
FIG. 3 illustrates an exemplary architecture of Electric Drive Assembly in the vehicle, in accordance with an embodiment of the present disclosure.

FIG. 3 illustrates an exemplary architecture of Electric Drive Assembly in the vehicle, in accordance with an embodiment of the present disclosure.

In an embodiment, the major parts of the hybrid electric drive system 106 includes the electric motor 108, epicyclic gear system and mode controller 110, the mode controller mechanism consisting of a mode shift axel 302, a mode shifter 304, a mode shifter cable connector 306, a mode controller lever 308, a mode controller lever 310 and a mode shifter cable connector 316, a ICE side propeller shaft 312, a EV drive assembly underfloor mounting 314, combined electro-mechanical accelerator control 220, and the motor controller (interchangeably known as controller unit) 112.

In an embodiment, the electric power is derived from the battery 114, or the hydrogen fuel cell stack mounted on the chassis frame of the vehicle 100 under the passenger or cargo compartment. Thereby, the new additions are maintained within the bodyline of the vehicle 100 and preserving the centre of gravity of the vehicle 100 as low to the ground as possible for better dynamic behaviour and balancing. The charging point 204 is located at a very convenient and easily accessible point on the vehicle 100 and charging is done by an external 15A charger. A three-phase charging adapter is also provided to aid in the fast charging of the vehicle 100.

In an embodiment, FIG. 3 shows the hybrid electric drive system 106 mounted on the vehicle 100. The electric motor 108 is mounted along with the epicyclic gear system 110 in a specially fabricated housing the hybrid electric drive system 106. The hybrid electric drive system 106 is mounted on the frame of the vehicle 100 in such a way that the output shaft of the IC engine assembly 118 and gearbox 116 and the propeller shaft differential side 236 from the hybrid electric drive assembly 106 housing are co-axial. The hybrid electric drive system 106 is mounted on the chassis frame of the vehicle 100 using special mountings 314. The output shaft of the hybrid electric drive system 106 is connected to the propeller shaft of the vehicle 236 using a universal joint coupling.

Figure 4A:
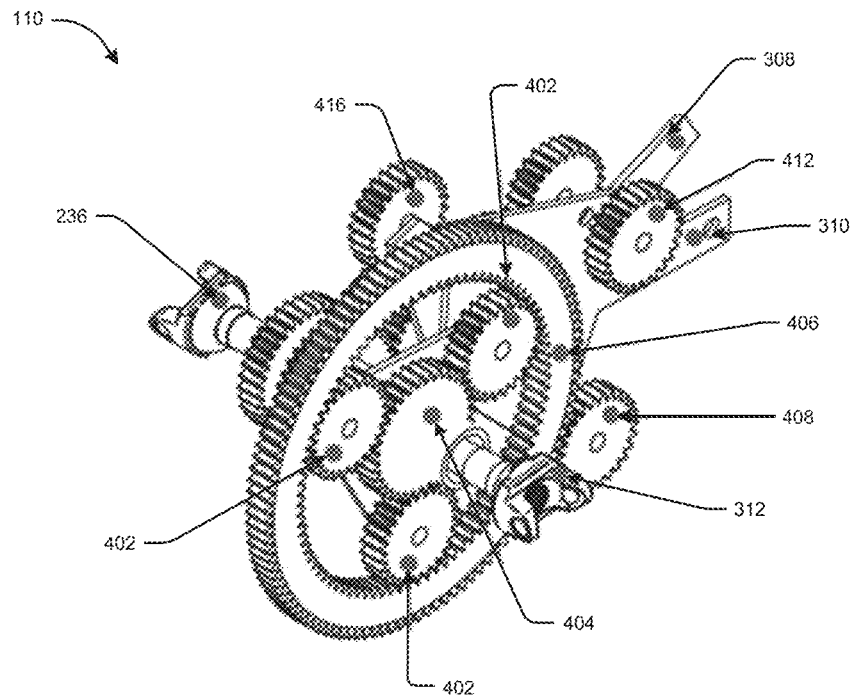
FIG. 4A illustrates the epicyclic gear system from engine side, in accordance with an embodiment of the present disclosure.

FIG. 4A illustrates the epicyclic gearbox from the engine side, in accordance with an embodiment of the present disclosure.

In an embodiment, the epicyclic gear system 110 is used in the hybrid electric drive system 106. The epicyclic gear system 110 consists of a set of planet gears 402, a sun gear 404, a ring gear 406. Further, the epicyclic gear system in conjunction with mode controller 108 includes propeller shaft differential side 236, a set of fixed gear (408, 416), a propeller shaft ICE gearbox side 312, a compound reverse gear 412, a reverse mode lever 308, and EV ICE mode lever 310.

Figure 4B:
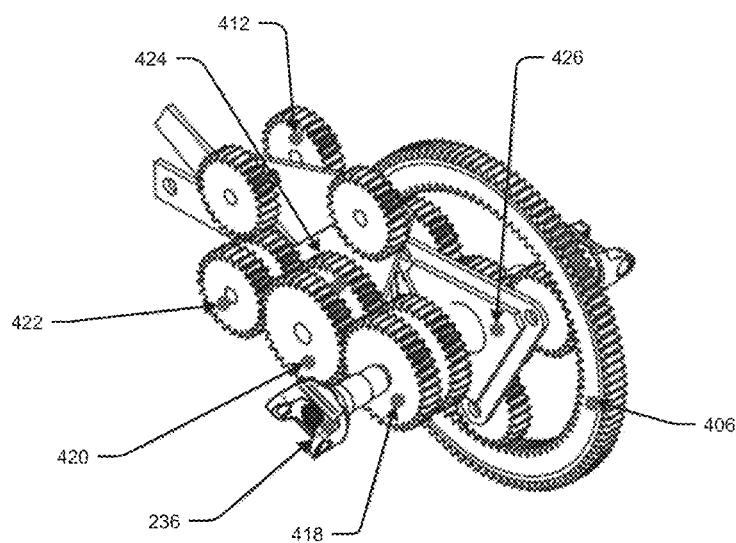
FIG. 4B illustrates the epicyclic gear system from motor side, in accordance with an embodiment of the present disclosure.

FIG. 4B illustrates the epicyclic gear system from the motor side, in accordance with an embodiment of the present disclosure.

In an embodiment, the epicyclic gear system 110 consists of the ring gear 406, the propeller shaft differential side 236, a pinion in-line motor side 418, a compound idler gear (420, 424), a compound pinion gear 422, a compound reverse gear 412, and a planet carrier 426.

In an embodiment, FIGS. 4A and 4B represent the epicyclic gear system 110 used in the hybrid electric drive system 106. The epicyclic gear system 110 consists of the planet gears 402, the sun gear 404, the ring gear 406, and the planet carrier 426. Unlike other epicyclic gearboxes used in automotive applications, here the output torque is taken from the sun gear 404 and the input torque is provided to the planet carrier 426 or the ring gear 406. The sun gear 404 receives the electric drive torque from the motor shaft via the planet gears 402 and the ring gear 406. Also, the sun gear 404 receives the IC engine torque from the IC engine assembly 118 and gearbox output shaft. The sun gear 404 transmits the individual or combined torque to the propeller shaft 236 via the universal joint coupling and output shaft 236.

Figure 5A:
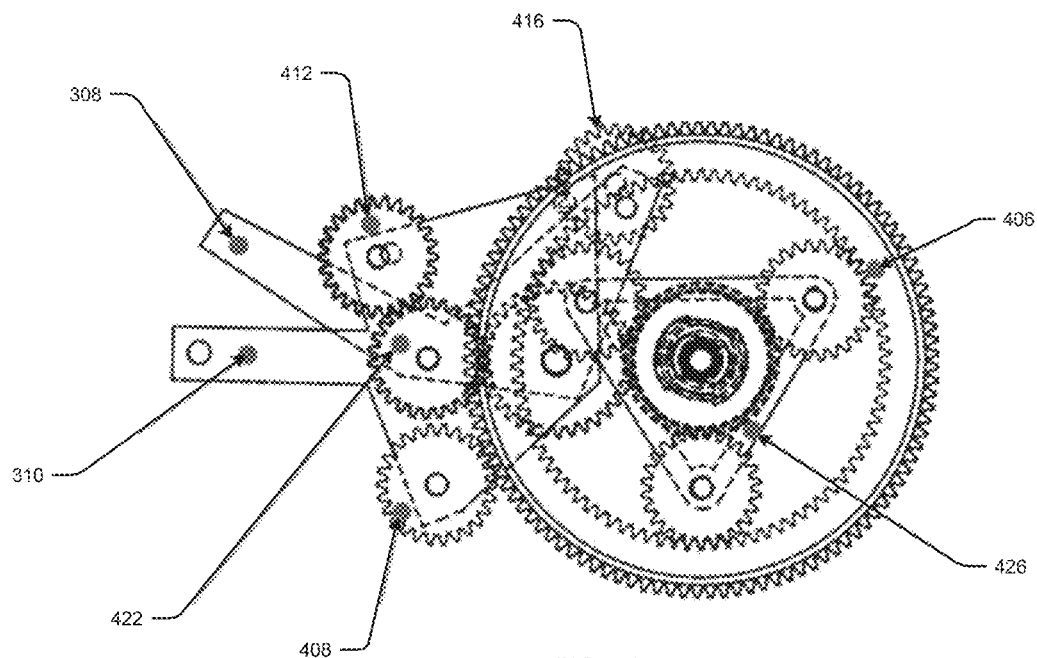
FIG. 5A illustrates the mode controller when in single mode, in accordance with an embodiment of the present disclosure.
Figure 5B:
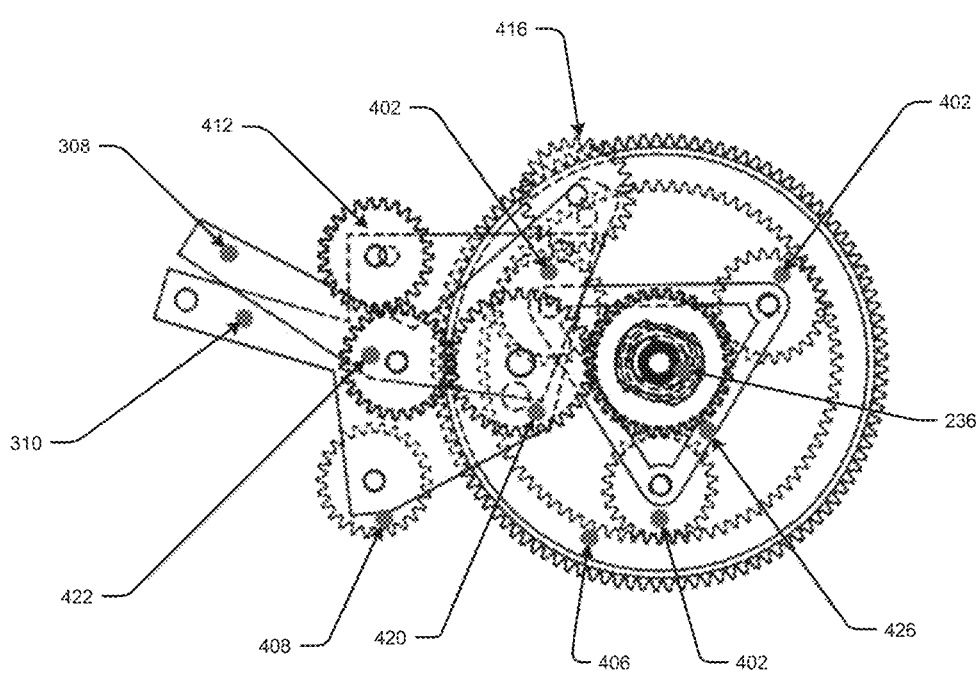
FIG. 5B illustrates the mode controller when in combined mode, in accordance with an embodiment of the present disclosure.
Figure 5C:
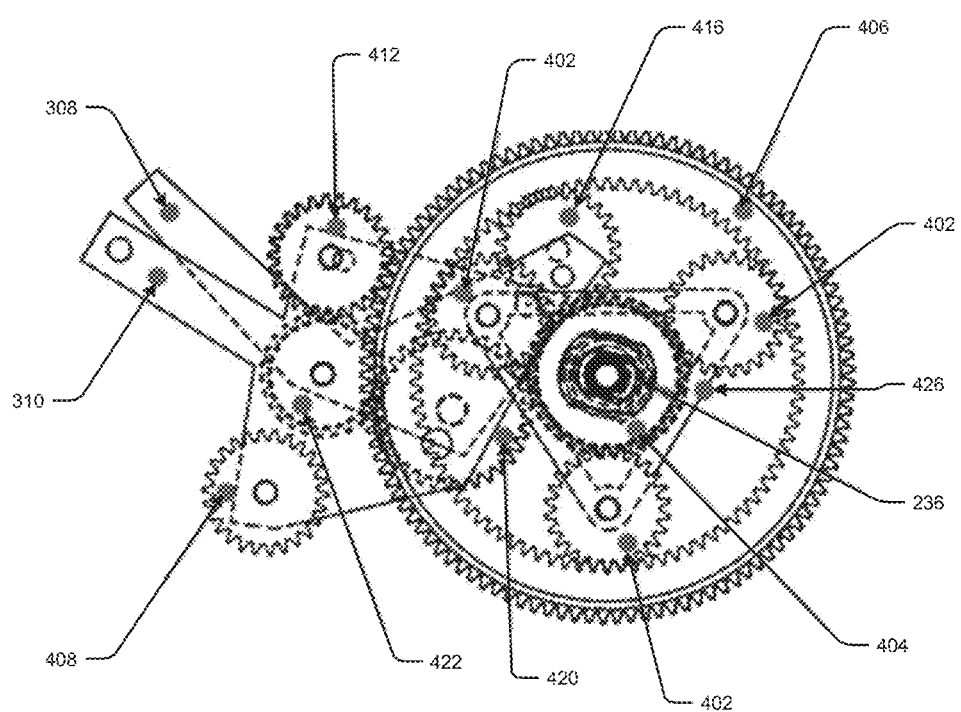
FIG. 5C illustrates the mode controller when in electric reverse mode, in accordance with an embodiment of the present disclosure.

FIGS. 5A, 5B, and 5C illustrate the mode controller when in single mode, combined mode, electric reverse mode, respectively, and in accordance with an embodiment of the present disclosure.

In an embodiment, FIG. 5A illustrates the mode controller 110 when in single mode, where the mode controller 110 includes mode controller levers (308 and 310), ring gear 406, fixed gears (408, 416), compound reverse gear 412, compound pinion gear 422, planet carrier 426. FIG. 5B illustrates the mode controller 110 when in combined mode, where the mode controller 110 includes mode controller levers (308 and 310), the planet gears 402, the sun gear 404, the ring gear 406, the fixed gear (408, 416), the compound pinion gear 422, the planet carrier 426, the compound reverse gear 412, the compound idler 420, the propeller shaft differential side 236. FIG. 5C illustrates the mode controller 110 when in electric reverse mode, where the mode controller 110 includes mode controller levers (308 and 310), the planet gear 402, the sun gear 404, the ring gear 406, the fixed gears (408, 416), the compound reverse gear 412, the compound pinion gear 422, the planet carrier 426, the propeller shaft differential side 236, and the compound idler gear 420, 424.

In another exemplary embodiment, FIGS. 5A, 5B and 5C illustrates uniquely designed mode controller 110 consists of a mechanical cable operated system, which controls the operation of various modes by locking different elements of the planetary gearbox. There are two levers (308, 310) that can be moved by the cable mechanism in different positions to enable the three different modes they are electric or IC engine mode, combined mode, and reverse in electric mode. The locking and unlocking of the planetary gearbox elements are done via the three pinion gears 408, 412, and 416. As shown in FIG. 5A for electric or IC engine mode, the levers (308, 310) are moved in such a position that the planet carrier 426 is not locked and can receive the power from the electric motor 108. The ring gear 406 is locked in position by the pinion 408. Further, depending on the switch 228 and 230 being in electric mode or engine mode either of the modes is enabled. For electric mode, the torque from the electric motor 108 is transmitted to the unlocked planet carrier 426 through the pinion gears 418, 420, and 422. This torque is then transmitted to the sun gear 404 to further transmit it to the propeller shaft 236. For engine mode, the torque from the engine is transmitted to the sun gear 404 directly by the gearbox output shaft 312. For combined mode, the levers 308, 310 are moved in a position to enable both the planet carrier 426 and the ring gear 406 to stay unlocked. The torque from the electric motor 108 is transmitted to the planet carrier 426 and then to the sun gear 404. Additionally, the sun gear 404 also receives the IC engine torque from the gearbox output shaft 312. The unlocked ring gear 406 allows the sun gear 404 to adjust to the torque being transmitted by both the electric motor 108 and the IC engine assembly 118 at the same time. Now, to reverse the vehicle 100 in electric mode, the levers 308, 310 are positioned as shown in FIG. 5C. Such positioning of the levers 308, 310 causes the planet carrier 426 to be locked by the pinion 416 and the ring gear 406 to mesh with the compound pinion gear 412. The electric motor torque is now transmitted to the ring gear 406. In this position as the planet carrier 426 is locked by the fixed gear 416 the planet gears 402 are locked and cannot revolve around the central gearbox axis but can only rotate around their own axis. This causes the sun gear 404 to rotate in a direction that is opposite to the rotation of the ring gear 406 and hence causing the propeller shaft 236 to rotate in the opposite direction and give the reverse direction to the wheels 102, 104.

In another embodiment, alternatively the mode controller 110 can be operated electronically using a microcontroller based mechanism that uses solenoid valves and actuators. Here the movement of the two levers 308, 310 can be done electronically instead of the mechanical cable arrangement to enable the three different modes Electric or IC engine mode, combined mode, and reverse in electric mode.

Figure 6:
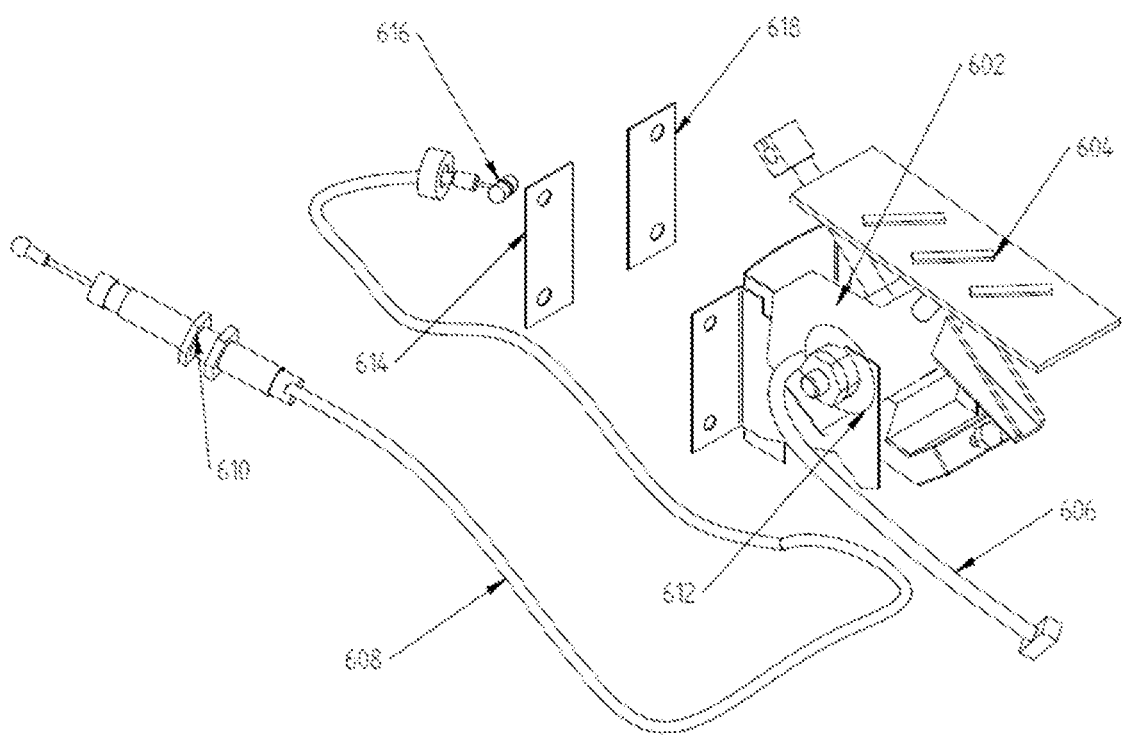
FIG. 6 illustrates combined electro-mechanical accelerator of the vehicle, in accordance with an embodiment of the present disclosure.

FIG. 6 illustrates the combined electro-mechanical accelerator of the vehicle, in accordance with an embodiment of the present disclosure.

In an embodiment, a specifically designed electro-mechanical accelerator is represented in FIG. 6. The electro-mechanical accelerator includes combined accelerator 220, accelerator pedal 604, mechanical cable 606, mechanical cable 608, mechanical adjuster 610, magnetic coupling and sensor 612, accelerator support 614, cable stretcher 616, and accelerator support 618.

In another embodiment, the combined accelerator 220 performs the function of accelerator for both electric and engine drives, which provides ease of operation to the driver for maintaining their driving habits. The accelerator pedal 604 operates both electric and internal combustion engine accelerators in unison. The mechanical cable 608 operates the mechanical system that provides the accelerator function for the internal combustion engine 118. The magnetic coupling and sensor 612 pass on the signal to the motor controller 112, which provides the accelerator function for the electric motor drive. Thus, the hybrid operation can be easily achieved through the common accelerator. There is a designed phase lag that allows the IC engine to lag behind the electric motor 108 when the user operates the accelerator pedal 604 while driving in combined mode.

In another exemplary embodiment, the hybrid electric drive system 106 of the present invention performs the role of synchronizing and transferring the torque generated by the two power-trains to the wheels of the vehicle 100. The hybrid electric drive system 106 performs the dual role of allowing drive from each powertrain to be transmitted individually to the wheels of the vehicle 102, 104 as demanded by the user, and adding the drive from each powertrain together and seamlessly transmitting to the wheels of the vehicle 102, 104 as demanded by the user. The hybrid electric drive system 106 allows true addition of the capabilities of the two different power-trains. The hybrid electric drive system 106 does not split the torque generated by either of the power-trains but adds the torque to satisfy the vehicle load demand by synchronizing the drives to best utilize the torque-speed characteristics of the two power-trains together. The hybrid electric drive system 106 makes a unique use of the epicyclic gear system in combination with the mode controller 110 to provide the necessary synchronization of the drives from the two distinct power-trains. When the user operates the hybrid electric drive system 106 for the combined mode, the epicyclic gear system is uniquely operated by the mode controller 110 to obtain the benefit of the torque-speed characteristics of the individual power-trains. The combined accelerator conveys the user demand to the hybrid electric drive system 106 and based on the total torque demand of the vehicle 100 the combination of the two power-trains is managed to deliver the required torque at the best possible efficiency. The combined accelerator 220 has a designed phase lag that allows the IC engine assembly 118 to lag behind the electric motor 108 and thus take advantage of the high initial starting torque of the electric power-train.

Figure 7A:
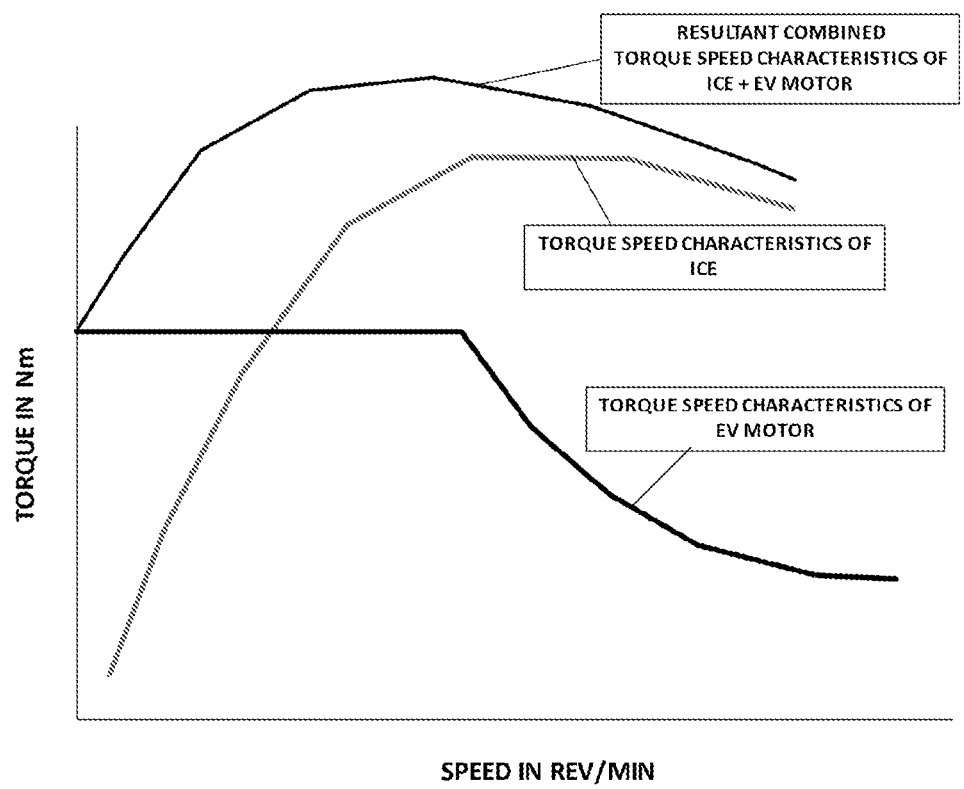
FIG. 7A illustrates graphical representation of the vehicle with resultant torque-speed characteristics, in accordance with an embodiment of the present disclosure.

FIG. 7A illustrates a graphical representation of the vehicle with resultant torque-speed characteristics, in accordance with an embodiment of the present disclosure.

In an embodiment, FIG. 7A represents the resultant representational torque speed characteristics delivered by the hybrid electric drive system 106. It can be seen that the resultant torque of the hybrid electric drive system 106 eclipses the maximum torque possible of the IC engine assembly 118 and this high resultant torque is available even at very low initial starting speed, thereby reducing the load on the IC engine assembly 118 significantly.

In an embodiment, FIG. 7A represents a graph, where x-axis is speed in revolutions per minute (rev/min) and y-axis is torque in N-m (newton-metre). The graph represents a torque speed characteristics of electric vehicle (EV) motor and a torque speed characteristics of an internal combustion engine (ICE). Further, the graph represents the resultant combined torque speed characteristics of ICE and EV motor.

Figure 7B:
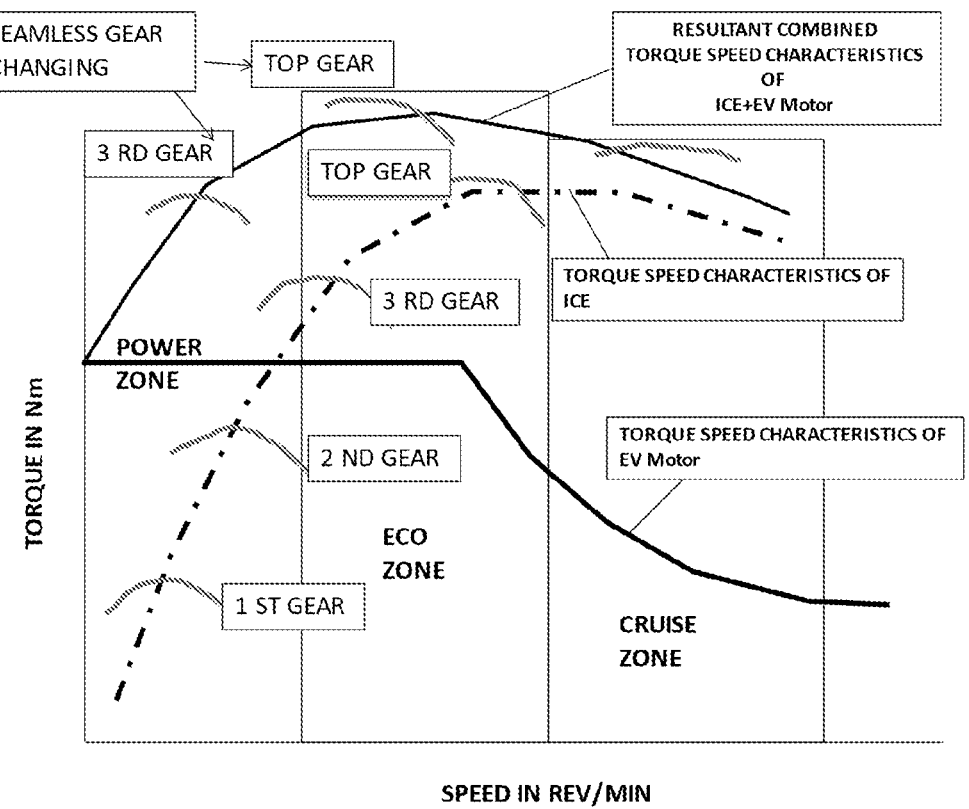
FIG. 7B illustrates graphical representation of the vehicle with resultant torque-speed characteristics under various drive cycles, in accordance with an embodiment of the present disclosure.

FIG. 7B illustrates graphical representation of the vehicle with resultant torque-speed characteristics under various drive cycles, in accordance with an embodiment of the present disclosure.

In an embodiment, FIG. 7B represents a graph, the resultant representational torque speed characteristics delivered by the hybrid electric drive system 106 under various drive cycles like a start-up and heavy acceleration (power zone), partial load condition (eco zone), and a steady state cruise condition (cruise zone). It can be seen that the majority of the high torque from the resultant hybrid drive becomes available even from low initial speeds. This helps in keeping the engine speeds much lower than desired as the engine isn't required to provide the complete torque needed to meet the load. By synchronizing the drives, the hybrid electric drive system 106 can reduce the load on the IC engine and thereby reduce the fossil fuel consumption and carbon and other harmful emissions by nearly up to 50%. Further reduction in harmful emissions can be achieved by improving the efficiency of the electric motor and battery pack.

In an embodiment, FIG. 7B represents a graph, where x-axis is speed in revolutions per minute (rev/min) and y-axis is torque in N-m (newton-metre). The graph includes representation of different gears such as $1^{st}$ gear, $2^{nd}$ gear, $3^{rd}$ gear, etc of the IC engine gearbox along with various zones such as cruise zone, eco zone and power zone. It can be seen that the resultant torque-speed characteristics of the hybrid electric system allows the vehicle to be operated in $3^{rd}$ or higher gears in the power zone unlike when in the IC engine mode where $1^{st}$ or $2^{nd}$ gear is needed in power zone. This translates to the engine being loaded less to provide the necessary drive when the vehicle is driven in combined mode, thereby resulting is savings of fuel and reduction in harmful emissions from the IC engine.

Figure 7C:
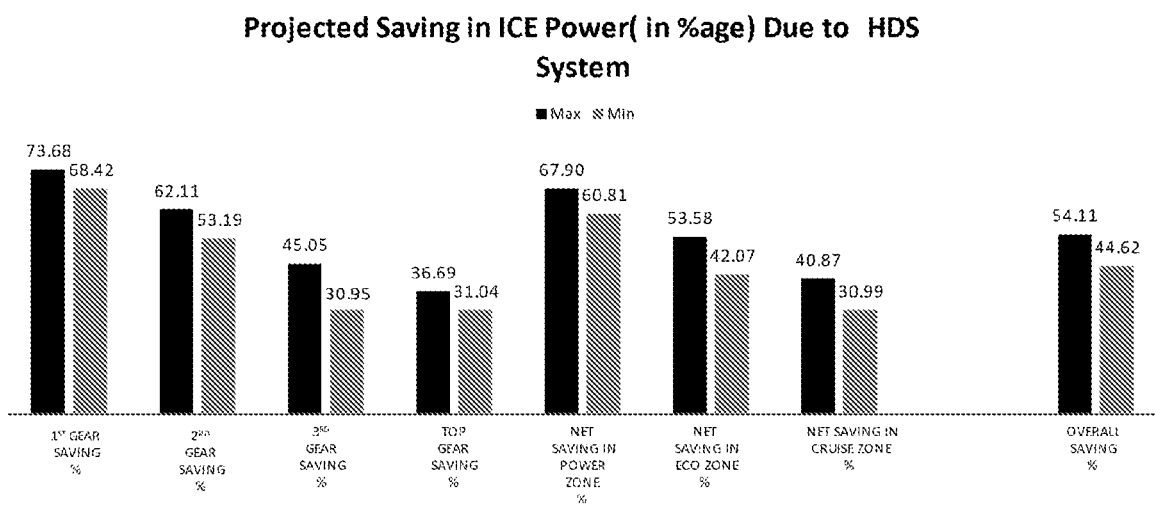
FIG. 7C illustrates graphical representation of the vehicle with resultant reduction in IC engine usage, in accordance with an embodiment of the present disclosure.

FIG. 7C illustrates a graphical representation of the vehicle with resultant reduction in IC engine usage, in accordance with an embodiment of the present disclosure.

In an embodiment, FIG. 7C represents the graph indicating a reduction in usage of IC engine power and in turn reduction in usage of fossil fuel and reduction in tail-pipe emissions by utilizing the uniquely designed Hybrid Drive System.

In an embodiment, FIG. 7C represents a graph which represents the saving in ICE Power in percentage (in % age) due to Hybrid Electric Drive System. When the vehicle 100 is operated at the $1^{st}$ gear the maximum ICE power saving may be 73.68% and the minimum ICE power savings may be 68.42%. When the vehicle 100 is operated at the $2^{st}$ gear the maximum ICE power saving may be 62.11% and the minimum ICE power savings may be 53.19%. When the vehicle 100 is operated at the $3^{rd}$ gear the maximum ICE power saving may be 45.05% and the minimum ICE power savings may be 30.95%. The maximum ICE power saving in power zone may be 67.90% and the minimum ICE power saving in power zone may be 60.81%. The maximum ICE power saving in eco zone may be 53.58% and the minimum ICE power saving in eco zone may be 42.07%. The maximum ICE power saving in cruise zone may be 40.87% and the minimum ICE power saving in cruise zone may be 30.99%. Finally, the overall maximum ICE power saving may be 54.11% and the overall minimum ICE power saving may be 44.11%.

Although this present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and of the present invention.

ADVANTAGES OF THE PRESENT DISCLOSURE

The present disclosure provides an efficient mechanism to build low emissions, fuel-saving hybrid electric drive system that can operate independently and in combined assist mode. Such a system would improve the fuel economy significantly and this would also mean a significant reduction in CO2 emissions per liter of fuel consumed.

The present disclosure provides a hybrid electric drive system that increases the life expectancy of the vehicle.

The present disclosure provides a hybrid electric drive system that provides a cost-effective solution to reduce the emissions from vehicles.

The present disclosure provides a hybrid electric drive system that helps in conserving the usage of fossil fuel thereby helping in reducing the import bills of such fuels for the nation.

The present disclosure provides a hybrid electric drive system which helps to extend the use of existing IC engine driven vehicle architectures and hence reduce the design and manufacturing costs for manufacturers.

We claim:

1. A hybrid electric drive system (106), said hybrid electric drive system (106) comprising:
    an electric motor (108); and
    an epicyclic gear system and mode controller (110);
    wherein the hybrid electric drive system (106) is configured between an Internal Combustion (IC) engine assembly (118) of a vehicle (100), an IC engine gearbox (116) of the vehicle (100) and a rear axle differential (238),
    the hybrid electric drive system (106) performing a dual role of allowing drive from the IC engine assembly (118) and the electric motor (108) to be transmitted individually to wheels of the vehicle (102, 104), and adding the drive from the IC engine assembly (118) and the electric motor (108) together, and seamlessly transmitting to the wheels (102, 104) of the vehicle,
    the epicyclic gear system and mode controller (110) allows output to be taken from a sun gear (404) of the epicyclic gear system and input to be given to at least one of planet carrier (426) or a ring gear (406) of the epicyclic gear system,
    power from the hybrid electric drive system (106) is transmitted by a common propeller shaft (236) of the vehicle (100) to the rear axle (238) through a differential gear,
    the power from both the IC engine assembly (118) and the electric motor (108) is transmitted to the sun gear (404) such that the sun gear (404) transmits the power to the common propeller shaft (236),
    the epicyclic gear system and the mode controller (110) comprises a first pinion gear (416) that locks and unlocks planet carrier (426), and a third pinion gear (408) that locks and unlocks the ring gear (406) of the epicyclic gear system, and
    the first and third pinion gears (416, 408) are respectively mounted on a first lever (308) and a second lever (310)—that move to different positions to enable locking or unlocking of at least one of the planet carrier (426) and the ring gear (406) for enabling different driving modes.

2. The hybrid electric drive system (106) as claimed in claim 1, wherein said hybrid electric drive system (106) is configured in a rear wheel drive plug-in hybrid electric four wheeler vehicle.

3. The hybrid electric drive system (106) as claimed in claim 1, wherein the hybrid electric drive system (106) enables driving independently in either an electric mode, an IC engine mode, or a combined mode.

4. The hybrid electric drive system (106) as claimed in claim 1, wherein the epicyclic gear system (110) allows electric drive from the electric motor (108) to be transmitted to the rear wheels (104) by using the common propeller shaft (236) that transmits the IC engine assembly (118) power to the rear wheels (104).

5. The hybrid electric drive system (106) as claimed in claim 1, wherein the epicyclic gear system (110) and the electric motor (108) are located as a single module on chassis frame of the vehicle (100) between the IC engine assembly (118), the gearbox (116) and the rear axle final drive (238) using mountings (314).

6. The hybrid electric drive system (106) as claimed in claim 1, wherein the hybrid electric drive system (106) comprises a mechanical cable operated assembly (302, 304, 306, and 316) that controls operation of the different driving modes by locking elements of the epicyclic gear system (110).

7. The hybrid electric drive system (106) as claimed in claim 6, wherein the epicyclic gear system and mode controller (110) comprises a second pinion gear (412) that transmits motor power to ring gear (406) of the epicyclic gear system, wherein the first and second levers (308, 310) move to the different positions to enable three different driving modes.

8. The hybrid electric drive system (106) as claimed in claim 3, wherein for electric or IC engine mode, the first and second levers (308, 310) are moved to a position so that the planet carrier (426) of the epicyclic gear system is unlocked, the electric motor (108) power is transmitted to the planet carrier (426) through a series of pinion gears (418, 420, 422) of the epicyclic gear system and mode controller (110), and the ring gear (406) is locked by the third pinion gear (408) such that the electric mode or the IC engine mode respectively is enabled.

9. The hybrid electric drive system (106) as claimed in claim 8, wherein for combined mode, the first and second levers (308, 310) are moved to the position so that the planet carrier (426) of the epicyclic gear system is unlocked, the motor power is transmitted to the planet carrier (426), and the ring gear (406) is unlocked such that unlocking of the ring gear (406) allows the sun gear (404) to adjust to the power being transmitted from both IC Engine and electric motor (108).

10. The hybrid electric drive system (106) as claimed in claim 9, wherein a combined accelerator (220) designed with a configurable phase lag allows the electric motor (108)

to speed up earlier than the IC engine owing to high initial starting torque of the electric power-train while being driven in the combined mode.

11. The hybrid electric drive system (106) as claimed in claim 9, wherein, for reverse in electric mode, the first and second levers (308, 310) are moved to the position so that the planet carrier (426) is locked by the first pinion gear (416), and electric motor power (108) is transmitted to the ring gear (406) via compound pinion gear (422) causing the sun gear (404) to spin in opposite direction to that of the ring gear (406) thereby reversing the motion.

12. The hybrid electric drive system (106) as claimed in claim 9, wherein locking of the planet carrier (426) and providing electric motor (108) power to the ring gear (406) causes the sun gear (404) to provide a output torque to the common propeller shaft (236) to spin in a direction opposite to a motor rotation.

13. The hybrid electric drive system (106) as claimed in claim 8, wherein during regeneration, mechanical power transfer from sun gear (404) to planet carrier (426) with the ring gear (406) locked or unlocked results in different levels of regeneration to allow battery pack (114) to be recharged depending on the state of charge.

14. The hybrid electric drive system (106) as claimed in claim 13, wherein the battery pack (114) is placed on chassis of the vehicle under its body.

15. The hybrid electric drive system (106) as claimed in claim 1, wherein a microprocessor operated system controls operation of one or more modes of the different driving modes by locking different elements of the epicyclic gear system (110), wherein a set of solenoid valves operates hydraulic actuators as per desired signal given by user via the microprocessor, wherein the hydraulic actuators operate the first and second levers (308, 310), wherein the epicyclic gear system and the mode controller (110) comprises the first pinion gear (416), a second pinion gear (412), and the third pinion gear (408), wherein the first pinion gear (416) locks and unlocks planet carrier (426), the third pinion gear (408) locks and unlocks ring gear (406), and the second pinion gear (412) transmits motor power to the ring gear (406), wherein these pinions are mounted on the first and second levers (308, 310) that move to different positions to enable the different driving modes.

16. The hybrid electric drive system (106) as claimed in claim 1, wherein the vehicle (100) comprises an optional fueling system of hydrogen fuel cells stack providing electrical energy to operate the electric motor (108), wherein a hydrogen fuel cells stack, the liquid hydrogen tank and battery pack is mounted on chassis of the vehicle (100) under its body.

17. The hybrid electric drive system (106) as claimed in claim 1, wherein electrical energy to operate the electric motor (108) is provided by an arrangement of ultra-capacitors.

18. A vehicle (100) comprising the hybrid electric drive system (106) as claimed in claim 1.

* * * * *